Sept. 28, 1937.  R. H. ZINKIL ET AL  2,094,288
MIXING VALVE
Filed June 11, 1934  2 Sheets-Sheet 1
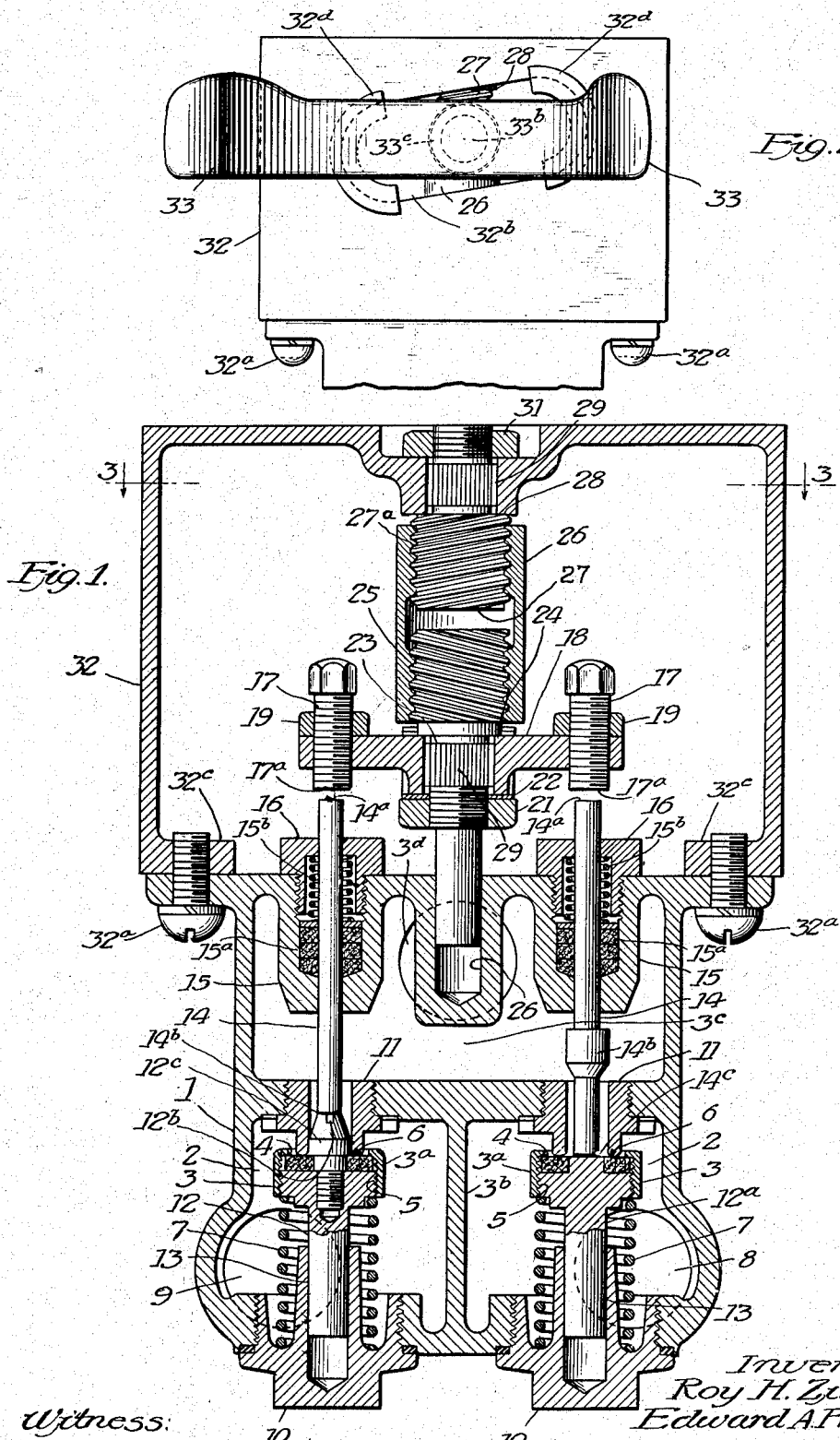
Inventors:
Roy H. Zinkil and
Edward A. Fredrickson
By Joseph O. Lange
Atty.

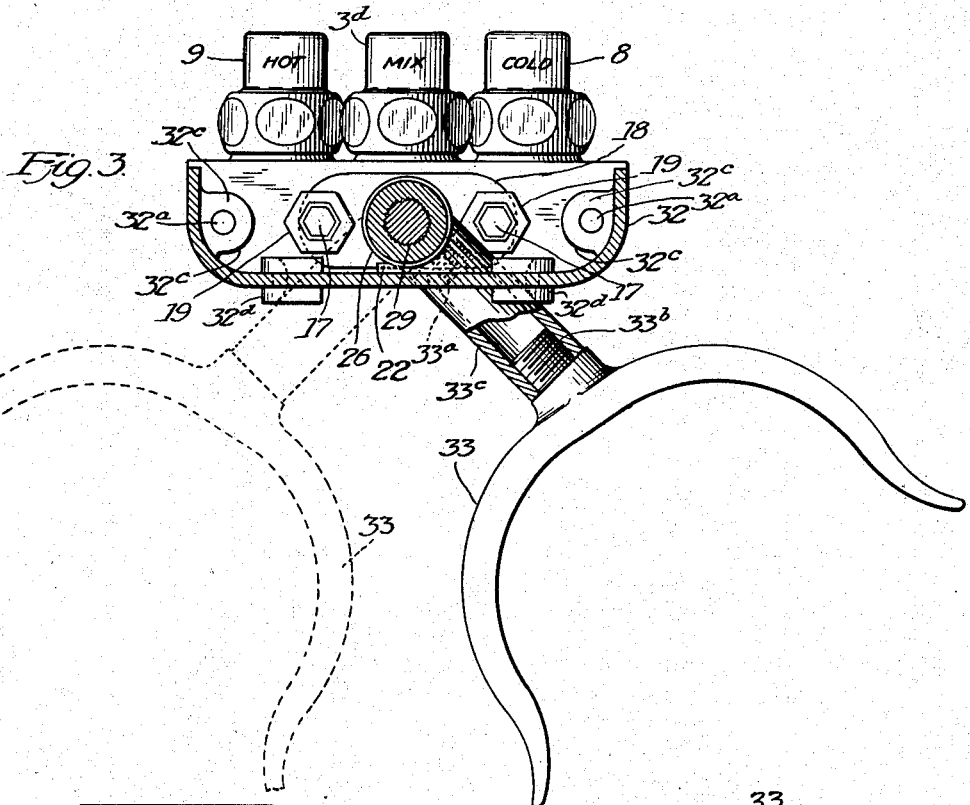
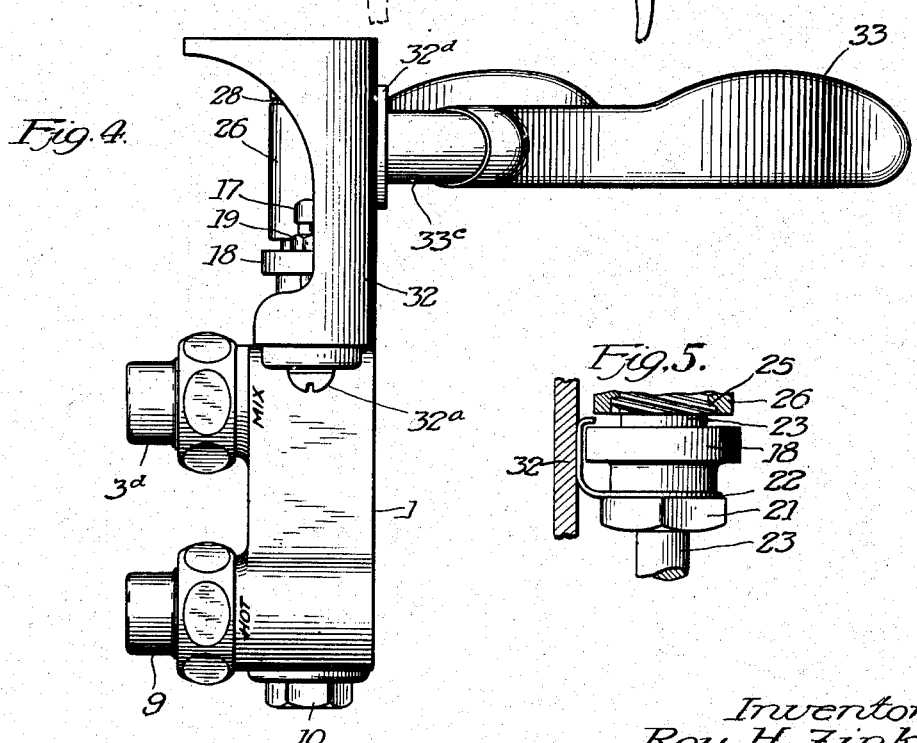

Patented Sept. 28, 1937

2,094,288

UNITED STATES PATENT OFFICE 2,094,288

MIXING VALVE

Roy H. Zinkil, Oak Park, and Edward A. Fredrickson, Chicago, Ill., assignors to Crane Co., Chicago, Ill., a corporation of Illinois Application June 11, 1934, Serial No. 730,004

9 Claims. (Cl. 277—18)

Our invention relates to that type of mixing valve in which hot and cold water are brought together from each of their respective supply pipes into a common chamber within the valve proper.

More particularly, the primary purpose of our invention is to provide for an accurate, convenient and easily controlled mechanical means for varying the temperature of the mixed water.

Another important object is to provide for a construction in which the adjustment of the respective hot and cold water valves is readily accessible after installation.

Another important object is to obtain the quick opening of both valves with a relatively small movement of the operating lever and with a smooth and uniform action, functioning by means of a compound movement employing right and left hand thread actuating means, or by a direct pedal action likewise producing a similar desirable result, the latter feature being separately claimed in our copending divisional application, Serial No. 110,582, filed November 13, 1936.

Another object is to provide certain improvements in mixing valves of this character affording ease of installation either upon the fixture or upon the ware itself, or independently, upon a wall bracket.

A further object of this invention relates to an improvement in knee action supply fixtures for hospital use and the like, in which a simple and convenient means of operation is obtained; adaptable for operation by the knees or foot rather than by the hands of the user, and the usual hot and cold water hand operated faucets being dispensed with, the contamination of the hands by the fixture is thus avoided.

We attain these objects by the mechanism illustrated in the accompanying drawings, in which—

Fig. 1 is a front, vertical sectional view, showing the internal relation of the valves and their controlling parts.

Fig. 2 is a partial, exterior front view, in reduced scale, showing the slightly inclined slot in which the forked operating lever travels in its span of operation for a knee operated valve.

Fig. 3 is a horizontal, sectional view, in reduced scale, taken upon the line 3—3 of Fig. 1.

Fig. 4 is a side external view, in reduced scale.

Fig. 5 shows the location of a friction spring, the purpose of which is to provide sufficient friction so as to permit maintaining the valve in any selected intermediate position without having the valve adjustment altered by line flow acting upon the operating means; the spring creating friction between the housing sufficiently to retard possible axial movement of the crosshead.

Similar numerals refer to similar parts throughout the several views aforementioned.

Referring to Fig. 1, the body 1 of the valve has a plurality of parallel valve chambers 2 at its lower end, containing the valve members 3 consisting preferably of a disc retaining ring 3a for the purpose of retaining a composition disc 4 by means of the threads 5. These valves more specifically are guided for reciprocatory movement, a poppet type, seat upwardly against the valve seats 6 under the action of the springs 7. The valve chambers 2 have lateral inlets 8 and 9 adapted to be connected with the respective cold and hot water supply pipes. (Indicated but not shown.)

The bottoms of the valve chambers are closed by means of the plugs 10, which retain the springs 7, the plugs being removable in order to get access to the valve members and springs without necessitating disconnection of the valves from the plumbing fixture itself. The valve members 6 preferably seat against renewable seat rings 11, preferably threadedly attached to the casing 1.

Each of the respective poppet valves are guided by the extension rods 12 and 12a which move in reciprocating manner within the respective bores 13 of the caps 10, the purpose of the guiding being to prevent a wobbling movement of the valve as it returns to its seat 6 under the action of the spring. The guide member 12, as previously mentioned, is threaded to provide for the retaining means 3 for the renewable disc 4. In referring to the valve shown in the left hand portion of Fig. 1, the guide member 12 is provided with a frustro-conical extension 12c against which the push rod 14 rests when the valve is installed in its normal position. The member 12c is preferably attached to guide means by screw driver slot 12b. This construction applies to the valve controlling the supply of hot water.

Referring to the right hand or cold water side of the Fig. 1 as designated by numeral 8, the guide 12a therein is made to permit the tappet rod 14b to bear against the latter as at 14c. The difference in the construction shown is to prevent the reversal of the respective valves. The tappet rod 14b as indicated is provided preferably integrally with an enlargement thereon for the purpose of diminishing the supply of cold water as the valve approaches its maximum movement in opening while the hot water under the same movement and by reason of the same form of enlargement attached to the guide member 12 increases in its volume in the amount of water entering through the seat opening as it is gradually being opened. Briefly, so far as volume is concerned, their action is reciprocal although this relationship as mentioned may be materially changed by the threaded adjusting screws hereinafter described.

The elongated push rods 14 are each journalled within a spring loaded stuffing box 15 extending through and beyond the bushing 16, and made of such proper length so as to permit the necessary clearance between the adjusting screw 17 and the end of the respective rods 14a. A crosshead member 18 supports the adjusting screws 17 in locked engagement by means of the locknuts 19 and is attached to the central operating means by a nut and friction spring washer, respectively designated as 21 and 22, and held in non-rotatable position by means of the rectangular shape of said crosshead, one side bearing on the inside wall of housing 32, the broaching 23, and against the shoulder 24, which is a part of the lower left hand thread member 25 engaging the sleeve 26. The lower end of the broached head 23 of lower thread member 25 is preferably made for guidance within the hollow guide 26. As shown more clearly in Fig. 5 the spring washer 22 which is interposed between the lower face of the crosshead 18 and the nut 21 is provided with an upturned flange contacting with the inner surface of the housing 32. Thus the washer 22 functions as a means to retard the axial movement of the crosshead member, whereby the latter is immovably maintainable in the intermediate positions of the valves.

In order to get the maximum axial movement with a minimum amount of turning movement, the upper half of the sleeve 26 is similarly threaded with a right hand thread of coarse pitch, as designated at 27a. The upper thread member 27 is pulled up to the shoulder 28 of housing 32 by means of the broached extension 29 and held in rigid and fixed position by means of the threaded nut 31, the entire upper half of the structure being enclosed by means of the housing 32 attached to the lower casing 1, preferably by the machine screws 32a. Preferably attached to the sleeve 26 is the extension stirrup handle or forked lever 33, as better shown in Fig. 3, made of such form as to readily adapt itself for movement by the shifting thereof by the operator's knee. The dotted lines in Fig. 3 indicate the movement of the stirrup handle from one extreme position to the other.

Directing attention to Fig. 2, the stirrup handle 33 is shown in approximately half way or mixing position. The slot 32b in which the aforesaid handle operates is slightly sloped as indicated, to allow for the lateral movement of the handle. Preferably to provide for a cushioned stop and prevent marring of the parts, a molded rubber bumper 32d is provided at each end.

Referring to Fig. 3, the stirrup handle 33 is attached to the threaded sleeve 26 by means of a short tube 33c, by means of threaded connections 33a and 33b.

As to Fig. 4, this shows a side view showing the partially opened back of the housing 32 for accessibility to the adjusting screws 17 and the locking nuts 19.

Having concluded the description of parts in Figs. 1 to 4 inclusive, the method of operation is as follows:

When the lever 33 in its arcuate movement is turned toward the left the sleeve 26 traveling axially upon the threads 25 and 27 respectively, because the latter are stationary due to their being nonrotatably attached at both ends, the aforesaid sleeve causes the crosshead 18 to move downwardly until the ends 17a of the adjusting screws 17 contact with the ends 14a of the push rods 14 and depending upon the extent of the turning of the lever 33, such depressing movement of the valve rods will continue until the spring loaded valve closure members 3 are moved from the seats 6, thus admitting the respective hot and cold water within the chamber 3c. It is obvious that the amount of depression of the respective valves is easily controllable by means of the fine adjustment permissible on the adjusting screws 17 mounted upon the crosshead 18.

Thus the temperature of the water and also the amount thereof entering the upper chamber 3c and discharging through the outlet 3d is conveniently handled.

It is apparent that this invention is capable of numerous modifications falling within the spirit of invention, as for example, more than one outlet may be used rather than as a single outlet as shown. We therefore desire to be limited only to the extent of the appended claims.

We claim:

1. In a mixing valve, comprising a casing having hot and cold fluid inlets thereto and a fluid outlet or outlets therefrom, a removable housing cooperating with said casing, simultaneously operable valves for the control of fluids through said inlets, a transversely divided stem within said housing comprising upper and lower oppositely threaded portions for actuating said valves, a crosshead mounted upon the lower portion of the said stem having adjustable means for actuating said valves, an actuating sleeve having oppositely threaded portions for complementary engagement with the said portions of the stem and connecting said portions, the said portions of the divided stem being selectively positioned axially and adjustable with relation respectively to the said housing and the said crosshead whereby the said complementary engagement and the extent of the reciprocal movement of the said valves is effected upon rotative actuation of the said sleeve.

2. In a mixing valve, comprising a casing having hot and cold fluid inlets thereto and a fluid outlet or outlets therefrom, a housing superposed above said casing, simultaneously operable valves for the control of fluids through said inlets, a transversely divided axially aligned stem for actuating said valves, a crosshead fixedly attached to the lower portion of said divided stem, the other portion of said stem being fixedly and non-rotatably mounted within said housing, a sleeve threadedly connecting the divided portions of said stem, a lockwasher interposed between said lower portion of said stem and said crosshead and bearing against said housing, whereby the said crosshead is held in frictional contact therewith when the said sleeve is rotated, the latter being manually operable exteriorly of said housing.

3. In a mixing valve, comprising a casing having hot and cold fluid inlets thereto and a fluid outlet or outlets therefrom, a housing superposed above said casing, simultaneously operable valves for the control of fluids through said inlets, an axially adjustable divided stem comprising upper and lower portions supported by said housing for actuating said valves, a crosshead supported by the lower portion of said stem and having adjustable means for actuating said valves, a sleeve having oppositely threaded portions engaging the ends of the said divided stem and connecting said portions, the said adjustability of the stem being obtained by selective positioning of said stem with relation to the said sleeve whereby the reciprocable movement of said valves is effected.

4. In a mixing valve comprising a casing having hot and cold fluid inlets thereto and a fluid outlet or outlets therefrom, the housing cooperating with said casing, simultaneously operable valves for the control of fluids through the said inlets, a transversely divided stem for actuating the said valves, a crosshead member having adjustable means for actuating the said valves, locking means for selectively mounting a portion of said divided stem in non-rotatable relation with said housing, a sleeve having oppositely threaded portions connecting the ends of the said divided stem, the said portions of the divided stem being axially adjustable with relation to the said sleeve whereby adjustment of the reciprocable movement of the said valves is effected.

5. In a mixing valve comprising a casing having hot and cold fluid inlets thereto and a fluid outlet or outlets therefrom, a housing cooperating with the said casing, simultaneously operable valves for the control of fluids through the said inlets, actuating means for the said valves, a transversely divided stem for actuating the said valves, a crosshead member having adjustable means for contacting with the said valves, a sleeve having oppositely threaded portions connecting the ends of the said divided stem, the said portions of the divided stem being axially adjustable with relation to the sleeve whereby control of the movement of the said valves is obtained.

6. In a mixing valve, comprising a casing having hot and cold fluid inlets thereto and a fluid outlet or outlets therefrom, a housing cooperating with the said casing, simultaneously operable valves for the control of fluids through said inlets, a transversely divided stem for actuating the said valves, a crosshead having adjustable means for actuating the said valves, a sleeve having oppositely threaded portions connecting the ends of the said divided stem, means interposed between said housing and the said crosshead whereby a slidable contact is maintained therebetween.

7. In a mixing valve comprising a casing having hot and cold fluid inlets thereto and a fluid outlet or outlets therefrom, a housing cooperating with the said casing, simultaneously operable valves for the control of fluids through the said inlets, actuating means for the said valves, comprising a transversely divided non-rotatable stem for actuating the said valves, a crosshead member having adjustable means for contacting with the said valves, a sleeve having oppositely threaded portions connecting the ends of the said divided stem, the said portions of the divided stem being axially adjustable with relation to the housing and the crosshead whereby control of the movement of the said valves is obtained.

8. In a mixing valve comprising a casing having hot and cold fluid inlets thereto and a fluid outlet or outlets therefrom, a housing cooperating with the said casing, simultaneously operable valves for the control of fluids through the said inlets, actuating means for the said valves, comprising a transversely divided non-rotatable stem for actuating the said valves, a crosshead member having adjustable means for contacting with the said valves, a sleeve having oppositely threaded portions connecting the ends of the said divided stem, frictional means interposed between said crosshead member and said housing whereby axial movement of the crosshead is frictionally retarded.

9. In a mixing valve, comprising a casing having hot and cold fluid inlets thereto and a fluid outlet or outlets therefrom, a removable housing cooperating with the said casing, simultaneously operable valves for the control of fluids through said inlets, a transversely divided stem for actuating said valves, a crosshead member mounted upon the lower portion of the said stem having adjustable means for simultaneously limiting the movement of the said valves, an actuating sleeve having oppositely threaded portions engaging the ends of the said divided stem and connecting said portions, operable means on said sleeve whereby desired reciprocable movement of the said valves is obtainable upon substantially 90° arcuate movement of said operable means, one portion of the divided stem being fixedly mounted relative to the housing and the other axially adjustable with relation to the said sleeve.

ROY H. ZINKIL.
EDWARD A. FREDRICKSON.